United States Patent
Zosimadis et al.

(10) Patent No.: US 11,026,539 B2
(45) Date of Patent: Jun. 8, 2021

(54) SIGNAL AND DETECTION SYSTEM FOR PAIRING PRODUCTS

(71) Applicant: Smart Wave Technologies, Inc., Mounds View, MN (US)

(72) Inventors: Peter Zosimadis, Toronto (CA); Steven Hackney, Toronto (CA)

(73) Assignee: Smart Wave Technologies, Inc., Mounds View, MN (US)

( * ) Notice: Subject to any disclaimer, the term of this patent is extended or adjusted under 35 U.S.C. 154(b) by 257 days.

(21) Appl. No.: 15/310,270

(22) PCT Filed: May 6, 2016

(86) PCT No.: PCT/CA2016/050524
§ 371 (c)(1),
(2) Date: Nov. 10, 2016

(87) PCT Pub. No.: WO2016/176779
PCT Pub. Date: Nov. 10, 2016

(65) Prior Publication Data
US 2017/0181570 A1    Jun. 29, 2017

Related U.S. Application Data

(60) Provisional application No. 62/158,414, filed on May 7, 2015.

(51) Int. Cl.
*A47J 31/44* (2006.01)
*G06K 19/06* (2006.01)
(Continued)

(52) U.S. Cl.
CPC ........ *A47J 31/4492* (2013.01); *G06K 7/1413* (2013.01); *G06K 19/0614* (2013.01); *G06K 7/12* (2013.01)

(58) Field of Classification Search
CPC .... G06K 7/12; G06K 19/0614; G06K 7/1413; A47J 31/4492; A47K 10/34; C02F 9/005;
(Continued)

(56) References Cited

U.S. PATENT DOCUMENTS 5,072,660 A * 12/1991 Helbling ............. A47J 31/5255
99/280
5,158,793 A * 10/1992 Helbling ............... A47J 31/525
426/231
(Continued)

FOREIGN PATENT DOCUMENTS

DE    102013013596 A1    2/2015
EP         1440640 A2    7/2004
(Continued)

OTHER PUBLICATIONS

International Search Report Application No. PCT/CA2016/050524 Completed: Jun. 27, 2016; dated Jun. 29, 2016 3 pages.
(Continued)

*Primary Examiner* — Eric S Stapleton
(74) *Attorney, Agent, or Firm* — Whitmyer IP Group LLC

(57) ABSTRACT

Systems and methods for differentiating the spectral response of various optical coatings between a transmitter and receiver are described. The system is effective in determining if an optical coating produces an authorized spectral response for determining if a product having that optical coating is authorized to be used with another product.

8 Claims, 11 Drawing Sheets

(51) Int. Cl.
*G06K 7/14* (2006.01)
*G06K 7/12* (2006.01)

(58) Field of Classification Search
CPC ............ C02F 2209/008; C02F 2209/42; C02F 2201/006; C02F 2209/40; B01D 2201/4046; B01D 2201/4023; B01D 29/606; B01D 35/143; B01D 27/101; B01D 2201/56; B01D 2201/52; B01D 2201/54
USPC ............ 99/295; 210/45, 85, 443, 87, 90, 91, 210/96.1; 700/231; 242/600
See application file for complete search history.

(56) References Cited

U.S. PATENT DOCUMENTS

| | | | | |
|---|---|---|---|---|
| 5,974,950 A * | 11/1999 | King | ............... | A47J 31/3633 99/289 R |
| 6,203,069 B1 * | 3/2001 | Outwater | ............... | G09F 3/0294 283/81 |
| 6,234,343 B1 * | 5/2001 | Papp | ............... | B65D 83/0454 221/197 |
| 6,601,729 B1 * | 8/2003 | Papp | ............... | A61J 7/0084 206/528 |
| 6,679,402 B1 * | 1/2004 | D'Alayer De Costemore D'Arc | ............... | A47F 1/035 222/413 |
| 7,216,582 B2 * | 5/2007 | Yoakim | ............... | A47J 31/0668 99/295 |
| 7,258,061 B2 * | 8/2007 | Campbell | ............... | A47J 31/52 99/283 |
| 7,335,387 B2 * | 2/2008 | Hayes | ............... | A47J 31/002 426/112 |
| 7,389,919 B2 * | 6/2008 | Walker | ............... | G06Q 20/209 235/380 |
| 7,444,925 B2 * | 11/2008 | Mahlich | ............... | A47J 31/3623 99/289 P |
| 7,513,412 B2 * | 4/2009 | Benedetti | ............... | A47J 31/3623 235/375 |
| 7,568,629 B2 * | 8/2009 | Lapstun | ............... | G06F 3/014 235/462.45 |
| 7,673,558 B2 * | 3/2010 | Panesar | ............... | A47J 31/4492 99/295 |
| 7,685,930 B2 * | 3/2010 | Mandralis | ............... | B65D 85/8043 99/295 |
| 7,798,055 B2 * | 9/2010 | Mandralis | ............... | A47J 31/3623 99/295 |
| 7,863,546 B2 * | 1/2011 | Hestekin | ............... | A23L 2/00 219/507 |
| 7,987,767 B2 * | 8/2011 | Hester | ............... | A47J 31/401 99/280 |
| 8,210,396 B2 * | 7/2012 | Girard | ............... | A47J 31/402 222/129.1 |
| 8,590,753 B2 * | 11/2013 | Marina | ............... | B67D 3/0019 222/325 |
| 8,695,484 B2 * | 4/2014 | Mori | ............... | A47J 31/44 99/295 |
| 8,833,238 B2 * | 9/2014 | Hansen | ............... | A47J 31/3695 99/283 |
| 8,857,317 B2 * | 10/2014 | Manser | ............... | A23L 33/40 99/289 R |
| 8,916,215 B2 * | 12/2014 | Yoakim | ............... | B65D 85/8043 426/77 |
| 8,943,952 B2 * | 2/2015 | Rahn | ............... | A47J 31/368 99/300 |
| 8,978,543 B2 * | 3/2015 | Baldo | ............... | A47J 31/3685 99/289 R |
| 9,027,466 B2 * | 5/2015 | Bucher | ............... | A47J 31/4492 99/295 |
| 9,320,385 B2 * | 4/2016 | Spiegel | ............... | A47J 31/3623 |
| 9,476,826 B2 * | 10/2016 | Izmailov | ............... | G01N 21/256 |
| 9,572,452 B2 * | 2/2017 | Rivera | ............... | A47J 31/3695 |
| 9,980,596 B2 * | 5/2018 | Rognon | ............... | A47J 31/3623 |
| 2002/0048621 A1 * | 4/2002 | Boyd | ............... | A47J 31/4492 426/77 |
| 2002/0078831 A1 * | 6/2002 | Cai | ............... | A47J 31/14 99/295 |
| 2003/0072489 A1 * | 4/2003 | Reichenbach | ... | G06K 19/06037 382/181 |
| 2003/0168389 A1 * | 9/2003 | Astle | ............... | B01D 35/143 210/85 |
| 2004/0010341 A1 * | 1/2004 | Watts | ............... | B82Y 10/00 700/240 |
| 2004/0016814 A1 * | 1/2004 | Muramatsu | ............... | H04N 1/00326 235/462.41 |
| 2004/0089158 A1 * | 5/2004 | Mahlich | ............... | A47J 31/4492 99/275 |
| 2004/0112222 A1 * | 6/2004 | Fischer | ............... | A47J 31/3638 99/279 |
| 2004/0188459 A1 * | 9/2004 | Halliday | ............... | A47J 31/4492 222/83 |
| 2004/0191370 A1 * | 9/2004 | Halliday | ............... | A47J 31/4492 426/112 |
| 2004/0191372 A1 * | 9/2004 | Halliday | ............... | A47J 31/0673 426/112 |
| 2004/0197444 A1 * | 10/2004 | Halliday | ............... | A47J 31/3695 426/112 |
| 2004/0206245 A1 * | 10/2004 | Halliday | ............... | A47J 31/56 99/337 |
| 2004/0211322 A1 * | 10/2004 | Halliday | ............... | B65D 85/8043 99/279 |
| 2005/0034604 A1 * | 2/2005 | Halliday | ............... | A47J 31/0673 99/279 |
| 2005/0150391 A1 * | 7/2005 | Schifferle | ............... | A47J 31/4492 99/295 |
| 2005/0247721 A1 * | 11/2005 | Simson | ............... | G07F 11/38 221/75 |
| 2005/0249052 A1 * | 11/2005 | Benedetti | ............... | A47J 31/4492 369/12 |
| 2006/0000851 A1 * | 1/2006 | Girard | ............... | B67D 1/0022 222/129.1 |
| 2006/0060512 A1 * | 3/2006 | Astle | ............... | B01D 29/606 210/85 |
| 2006/0080819 A1 * | 4/2006 | McAllister | ............... | G06K 17/00 29/403.3 |
| 2007/0157821 A1 * | 7/2007 | Panesar | ............... | A47J 31/0673 99/279 |
| 2007/0163446 A1 * | 7/2007 | Halliday | ............... | A47J 31/3695 99/279 |
| 2007/0175334 A1 * | 8/2007 | Halliday | ............... | A47J 31/4492 99/279 |
| 2007/0186923 A1 * | 8/2007 | Poutiatine | ............... | G06F 19/3462 128/200.14 |
| 2008/0050490 A1 * | 2/2008 | Stalder | ............... | A47J 31/407 426/475 |
| 2008/0134902 A1 * | 6/2008 | Zimmerman | ............... | A47J 31/56 99/302 R |
| 2008/0164275 A1 * | 7/2008 | Poutiatine | ............... | A61J 7/0023 221/15 |
| 2008/0187638 A1 * | 8/2008 | Hansen | ............... | A47J 31/4492 426/433 |
| 2008/0302251 A1 * | 12/2008 | Rijskamp | ............... | A47J 31/4492 99/295 |
| 2009/0002134 A1 * | 1/2009 | McAllister | ............... | G06K 19/07749 340/10.51 |
| 2009/0177315 A1 * | 7/2009 | Goeking | ............... | A47K 10/34 700/231 |
| 2009/0219140 A1 * | 9/2009 | Guard | ............... | A47J 31/407 340/10.1 |
| 2009/0314829 A1 * | 12/2009 | McAllistor | ............... | G06K 7/0095 235/375 |
| 2010/0005973 A1 * | 1/2010 | Doglioni Majer | ............... | B65D 85/8046 99/295 |
| 2010/0078480 A1 * | 4/2010 | Aker | ............... | G06K 19/06009 235/462.08 |
| 2010/0132564 A1 * | 6/2010 | Ozanne | ............... | A47J 31/4492 99/275 |

(56) References Cited

U.S. PATENT DOCUMENTS

| | | | |
|---|---|---|---|
| 2010/0253476 A1* | 10/2010 | Poutiatine | G06F 19/00 340/10.1 |
| 2010/0283584 A1* | 11/2010 | McAllister | B65C 11/006 340/10.1 |
| 2010/0289627 A1* | 11/2010 | McAllister | G06F 21/44 340/10.42 |
| 2011/0200726 A1* | 8/2011 | Tinkler | A47J 31/3676 426/431 |
| 2012/0056002 A1* | 3/2012 | Ritamaki | G06K 19/0723 235/492 |
| 2012/0256732 A1* | 10/2012 | McAllister | G06K 19/077 340/10.2 |
| 2012/0295234 A1* | 11/2012 | Rognon | A47J 31/4492 434/127 |
| 2012/0312174 A1* | 12/2012 | Lambert | A47J 31/3638 99/295 |
| 2013/0014648 A1* | 1/2013 | Rognon | B65D 85/8043 99/280 |
| 2013/0090594 A1* | 4/2013 | Palmer | A61J 7/0436 604/60 |
| 2013/0129872 A1* | 5/2013 | Kruger | B65D 85/8043 426/115 |
| 2013/0236609 A1* | 9/2013 | Magniet | A47J 31/0642 426/87 |
| 2014/0220184 A1* | 8/2014 | Boggs | B65D 81/02 426/87 |
| 2014/0267719 A1* | 9/2014 | Akdogan | A61J 1/03 348/143 |
| 2014/0278510 A1* | 9/2014 | McLean | A61J 7/0076 705/2 |
| 2014/0322682 A1* | 10/2014 | Baym | G09B 7/02 434/219 |
| 2014/0322683 A1* | 10/2014 | Baym | G09B 5/00 434/219 |

FOREIGN PATENT DOCUMENTS

| | | |
|---|---|---|
| JP | 2000218816 A | 8/2000 |
| JP | 2011507632 A | 3/2011 |
| JP | 2013542408 A | 11/2013 |
| JP | 2014511712 A | 5/2014 |
| WO | 2012031354 A1 | 3/2012 |
| WO | 2012123440 A1 | 9/2012 |
| WO | 2015004551 A1 | 1/2015 |

OTHER PUBLICATIONS

Written Opinion of the International Searching Authority Application No. PCT/CA2016/050524 Completed: Jun. 27, 2016; dated Jun. 29, 2016 4 pages.

European Search Report Application No. 16789000.3 Completed: Nov. 27, 2018; dated Dec. 4, 2018 8 Pages.

* cited by examiner

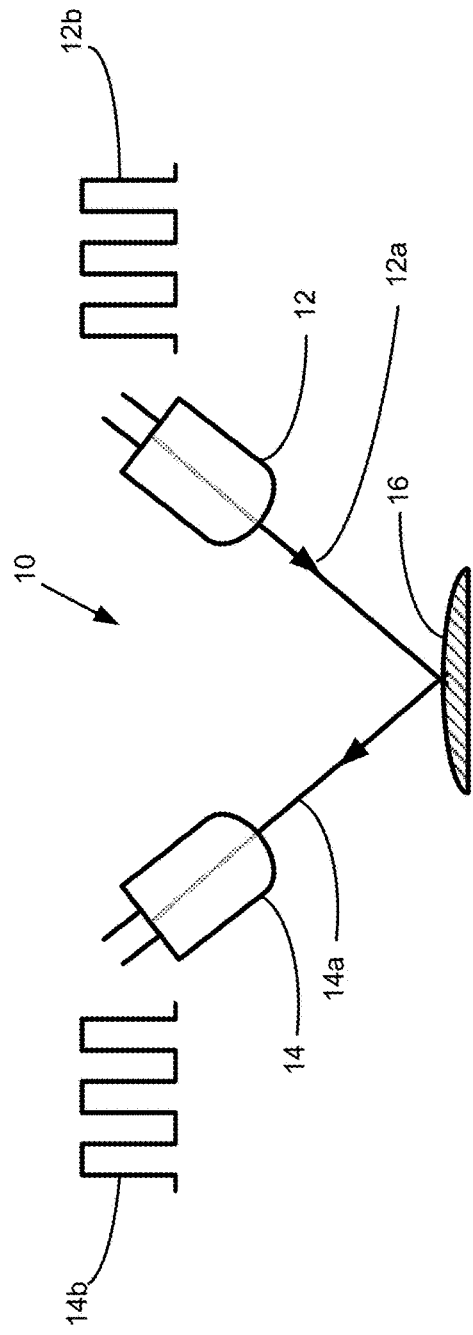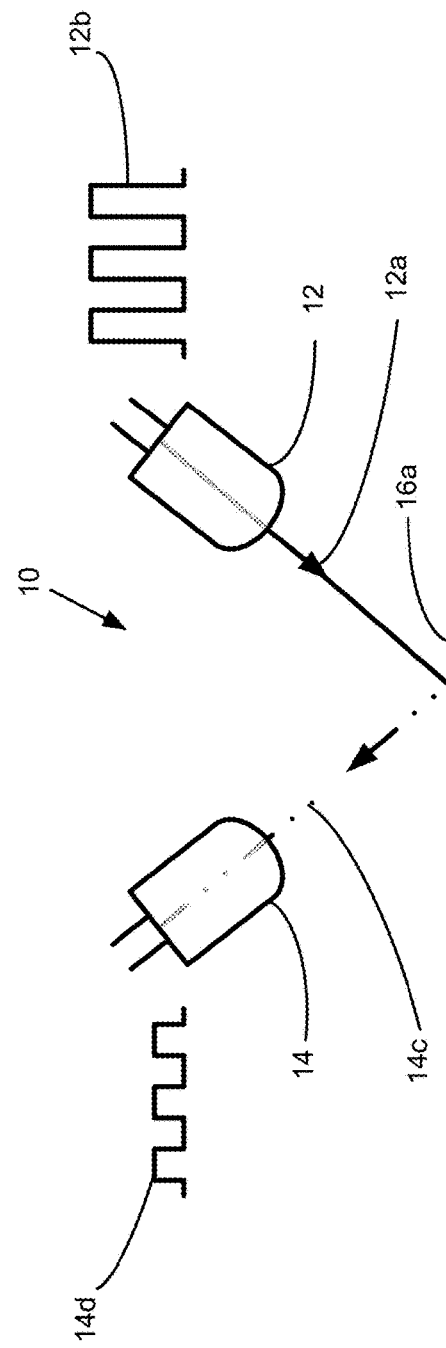

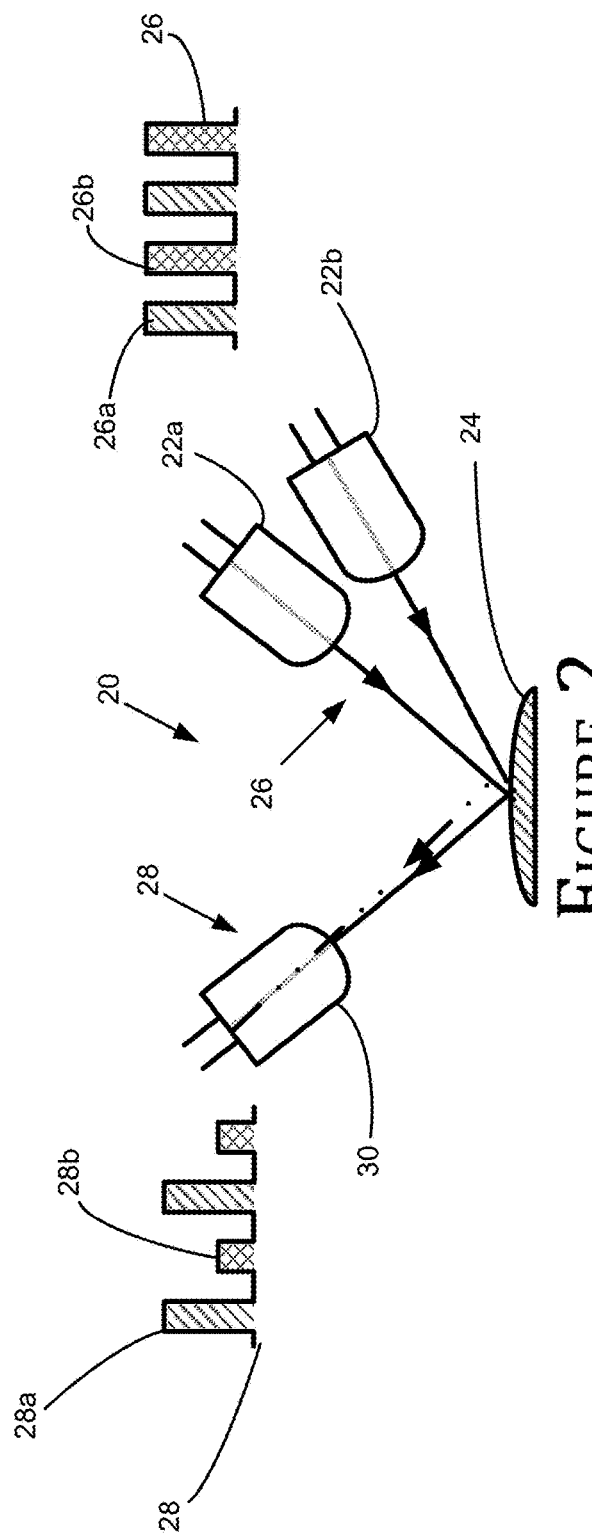
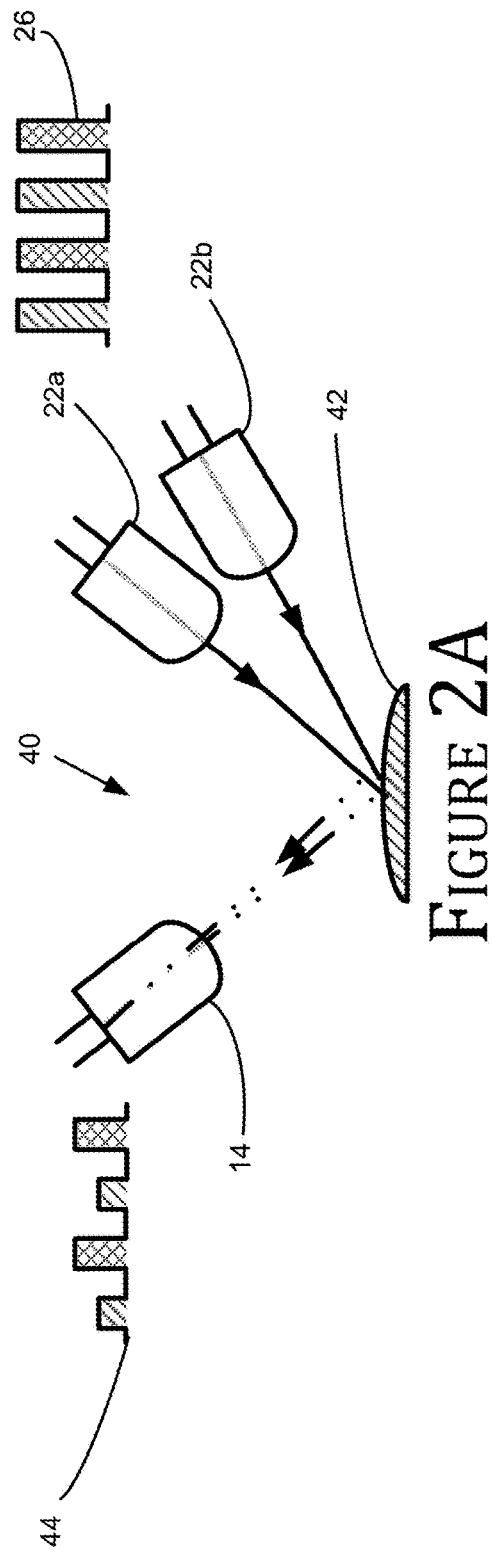

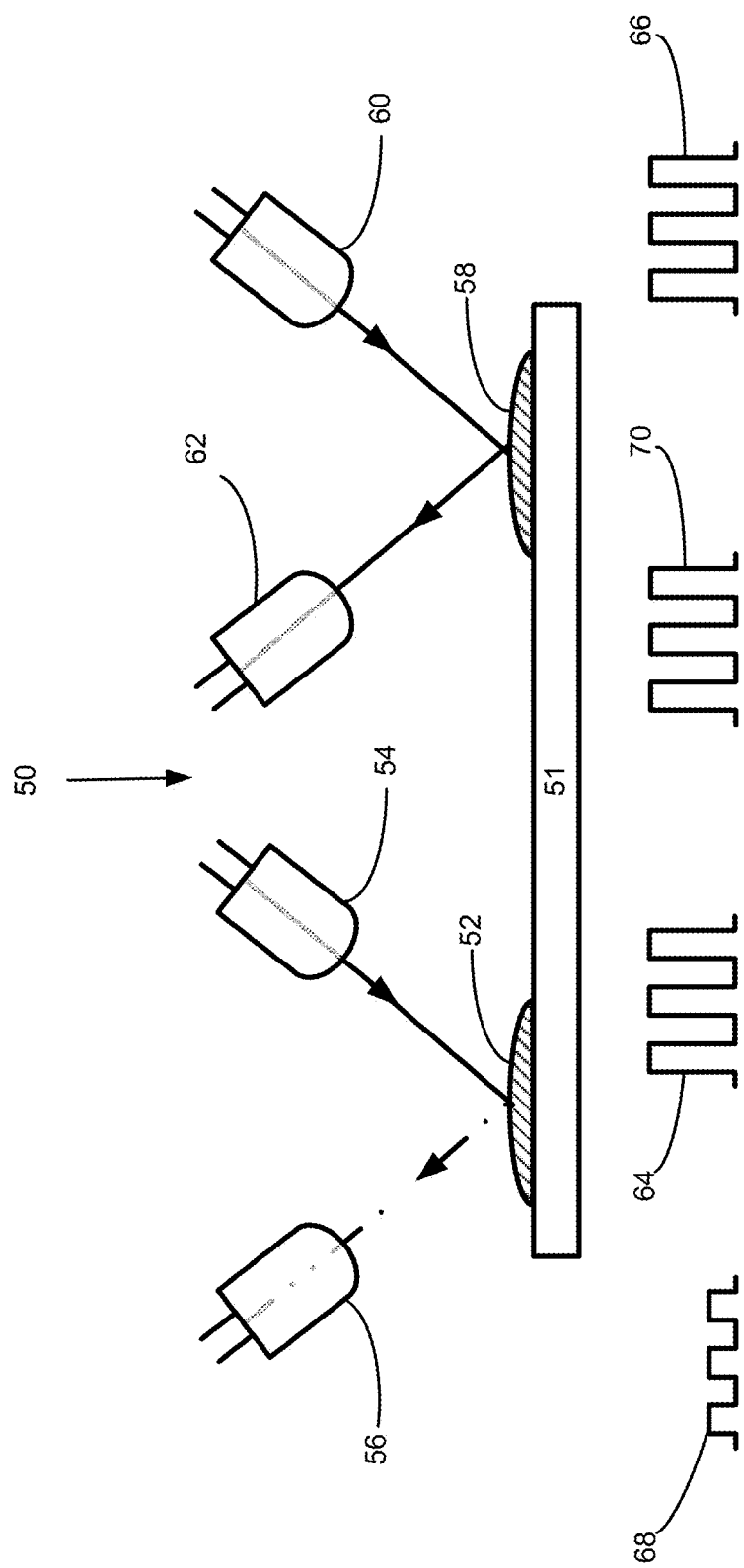

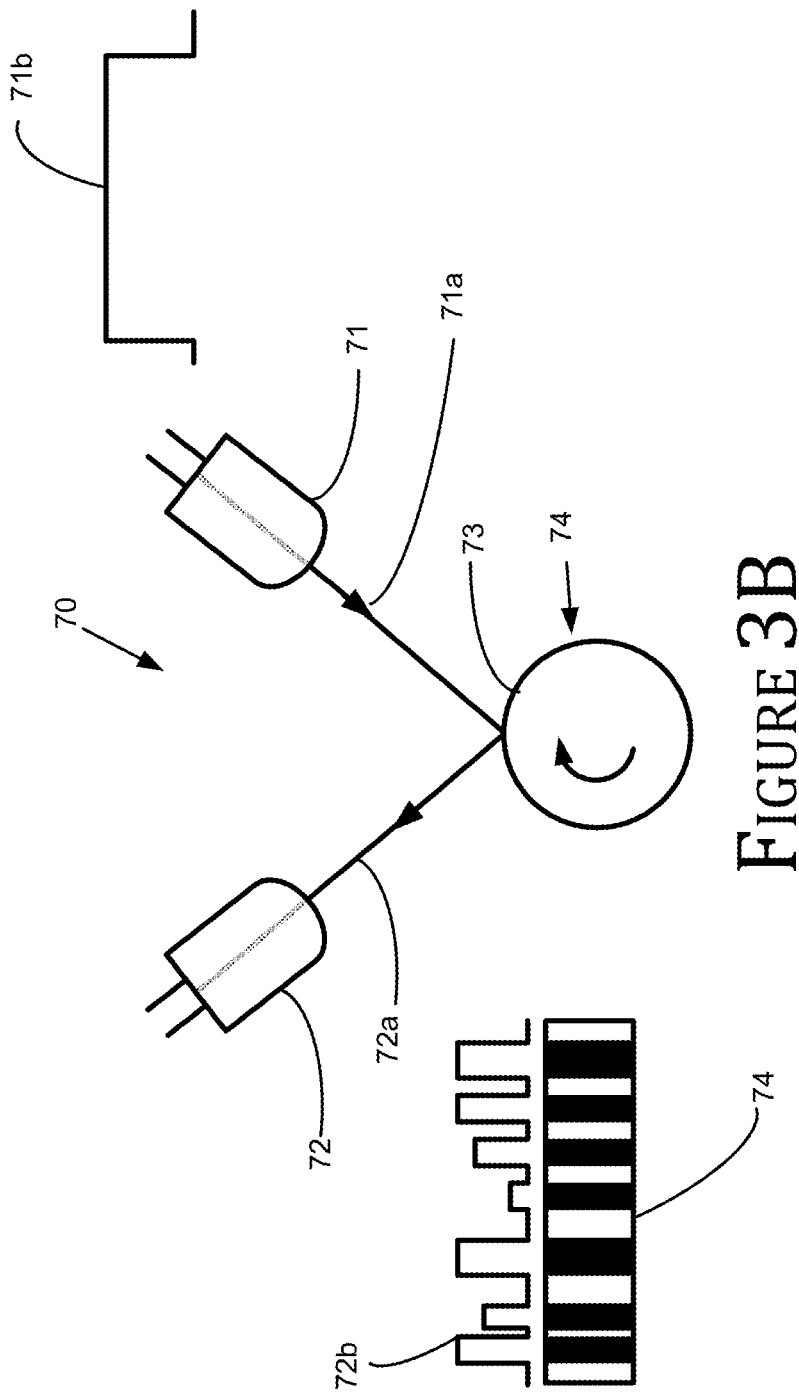

SIGNAL AND DETECTION SYSTEM FOR PAIRING PRODUCTS

TECHNICAL FIELD

Systems and methods for pairing products are described that reduce the ability of users to use unauthorized products within a product pair. The systems and methods are particularly useful when pairing a disposable cartridge that may be used within a dispenser to dispense a product within the disposable cartridge.

BACKGROUND

In today's competitive marketplaces, with many products and services, the costs for companies to create, maintain and grow new markets and market share is becoming increasingly expensive. As such, there is an increasing demand for technologies that provide a low cost means of ensuring that one company's (a "first company") investment into a product and/or marketplace is protected against newcomers that may be attempting to get into that marketplace by following the lead of the first company. For example, there exists a need for companies to have a means of protecting the products they develop from being counterfeited and/or being undercut by newcomers who, by utilizing the research and development of the first company, can produce a counterfeit or cheaper product without the same degree of development work. In addition, it is also important for the first company, who may also have invested substantially in the brand name and/or goodwill associated with a product to protect the brand name and/or goodwill and the associated revenue stream by reducing the ability of competitors to create and market products that provide similar or confusingly similar products that can be used with the first company's products.

The above is particularly important for companies selling consumable products and the case where a competitor may wish to sell a competing "re-fill" type product for use with a particular apparatus of the first company. For example, the first company may have developed a dispensing product that includes a dispensing apparatus that incorporates a consumable component in the form of a cartridge or other container. In this case, the consumable component is replaced at regular intervals after the consumable is used up and the first company looks to re-coop its development costs for the dispensing apparatus through the repeated sales of the consumable component. Often, a competitor will seek to undercut the pricing of the consumable component by producing an "unauthorized" consumable component that can be used with the first company's dispensing product without incurring the development costs of either the more expensive dispensing product and/or the consumable component. In this space, there are examples of both single-use cartridges that must be replaced after every use as well as multiple use cartridges that deliver multiple amounts of dispensing product over a number of dispense cycles or have a use-life based on a number of dispense cycles. An example of a single-use dispense cartridge is a single-use coffee cartridge. An example of multiple-use cartridges are printer-toner cartridges for use within printers and air freshener cartridges used with air freshener dispensers. An example of a cartridge having a life based on a number of dispense cycles is a water filter cartridge used with a water dispenser where the filter cartridge is designed to filter a fixed volume of water before replacement.

In the past, while there have been various solutions developed to make it more difficult for the competitor to successfully integrate an unauthorized consumable product with various dispensing apparatus, there continues to be a particular need for lower cost solutions that prevent the use of unauthorized products within certain apparatus in order to protect the brand name and/or revenue stream of the authorized product. In addition, a lower cost solution may expand the number of products in which an authentication process could be implemented between the different product pairs.

Further still, there has been a need for systems and methods that overcome a competitor's attempt to overcome security features that may be built into a consumable product during a pairing process with the product in which the consumable product is used (eg. the "dispensed product"). That is, in the case of codes that may be incorporated into a consumable product, depending on the complexity of the code, a competitor may be able to overcome the security features by tricking the dispensing product into recognizing an expired or used code as a valid code.

For example, a competitor may remove the code associated with a consumable product and affix it within the dispensing product in a location such that the dispensing product believes that it is reading a valid code even though the consumable product is being replaced with a non-authorized product. An example of this might be a coffee cartridge that is used in a coffee brewing and dispensing machine. The manufacturer of a coffee brewing and dispensing machine may desire that only its authorized coffee cartridges are used in its machine as the revenue derived from selling cartridges is substantially greater than selling coffee machines. Moreover, the coffee machine manufacturer may have invested substantially in the technology of the coffee machine itself as well as their trade-marks, good will, distribution networks and other aspects of their business. Competitors, who have not made these investments, may be simply seeking to piggy-back on the coffee machine manufacturer's investments by producing a coffee cartridge that is lower priced and works within the coffee machine.

As mentioned above, the competitor may be able to overcome security features built into the coffee cartridge by a variety of techniques which could include a number of actions including removing a valid code from an authorized coffee cartridge and placing it in a location within the coffee machine such that the coffee machine believes it is always reading a valid code, producing cartridges with "false" codes (eg. codes that are the same as the coffee machine manufacturer's codes), disabling or bypassing the coffee machine code readers and other methods.

As discussed in Applicant's co-pending application, U.S. patent application Ser. No. 13/791,073 filed Mar. 8, 2013 and entitled "Signal and Detection System for Keying Applications" (incorporated herein by reference), one effective technology for providing a low-cost pairing between products are systems utilizing light-emitting diodes (LEDs) that emit LED light against optical surfaces and analyze the spectral response received from the LED reflected from such surfaces as a means of recognizing and validating product pairs.

While such systems are effective in ensuring effective product pairing and prevention of authorized products, there continues to be a need for additional security and features associated with pairing.

SUMMARY

In accordance with the invention, systems and methods for differentiating the spectral response of various optical coatings between a transmitter and receiver are described.

The systems described herein are effective in determining if an optical coating produces an authorized spectral response for then determining if a product having that optical coating is authorized to be used with another product.

In accordance with a first aspect, there is provided a system for differentiating the spectral response of one or more optical coatings on a substrate between a transmitter and receiver comprising: a transmitter operatively located adjacent the optical coating for transmitting a first light signal against an optical coating; a receiver operatively located adjacent the optical coating for receiving reflected light off the optical coating; and, receiver electronics operatively connected to the receiver for interpreting reflected light at the receiver against an authorized signal and determining if the optical coating is an authorized or unauthorized optical coating. In a preferred embodiment, the transmitter is an LED light source.

In another aspect, the invention provides a method of evaluating a substrate having an optical coating in relation to a primary apparatus comprising the steps of: a) positioning the optical coating of the substrate in an operative position relative to the primary apparatus; b) transmitting a first light signal against the optical coating from the primary apparatus; c) receiving a reflected light signal on the primary apparatus from light reflected off the optical coating; d) comparing the reflected light signal to a pre-determined signal pattern and determining if the reflected light signal matches the pre-determined signal pattern; e) providing a response signal based on the result of step d).

In another aspect, the invention provides a method of verifying a code on a replaceable cartridge within a dispenser wherein the dispenser includes a controller having a verification system for detecting if a cartridge is within the dispenser, for reading a code on the replaceable cartridge when the replaceable cartridge is operatively connected to the dispenser, and for controlling activation of the dispenser, the method comprising the steps of: a) monitoring if a replaceable cartridge is operatively connected to the dispenser; b) if a replaceable cartridge is detected as operatively connected to the dispenser, determining if the replaceable cartridge has an authorized code; c) if a replaceable cartridge has an authorized code, activating the dispenser; d) if a replaceable cartridge does not have an authorized code, modifying dispenser activation; e) monitoring if a replaceable cartridge is no longer operatively connected to the dispenser; f) if a replaceable cartridge has been removed, activating the verification system to determine if an authorized code is present; and g) if an authorized code is present, modifying dispenser activation.

In one embodiment, the method includes the step of: if in step f) no authorized code is present, monitoring to determine if a replaceable cartridge is present in the dispenser.

In one embodiment, the dispenser has a display system and the method includes the step of: if in step f) an authorized code is present, displaying on the display system a signal instructing removal of the replaceable cartridge.

In one embodiment, the method includes the step of: if step d) an unauthorized code is present, displaying on the display system a signal instructing removal of the replaceable cartridge.

In another aspect, the invention provides a method of monitoring the status of a replaceable cartridge within a dispenser wherein the replaceable cartridge has an authorization code readable by the dispenser and wherein the dispenser includes a controller for controlling activation of the dispenser, a verification system for reading the authorization code on the replaceable cartridge when the replaceable cartridge is operatively connected to the dispenser and a cartridge detection system for detecting if a cartridge is within the dispenser, the method including the steps of: a) monitoring if the replaceable cartridge is operatively connected to the dispenser; b) if the replaceable cartridge is detected as operatively connected to the dispenser, determining if the replaceable cartridge has an authorized code; c) if the replaceable cartridge has an authorized code, enabling activation of the dispenser; d) if the replaceable cartridge does not have an authorized code, modifying dispenser activation; e) monitoring if the replaceable cartridge has been removed from the dispenser; f) if the replaceable cartridge has been removed, activating the verification system to determine if an authorized code is present; and g) if an authorized code is present, modifying dispenser activation.

In another embodiment, if in step f) no authorized code is present, repeating steps a) to g).

In another embodiment, if the dispenser has a display system and if in step f) an authorized code is present, displaying on the display system a signal instructing removal of the replaceable cartridge.

In another embodiment, if step d) an unauthorized code is present, displaying on the display system a signal instructing removal of the replaceable cartridge.

In further embodiments, in steps g) and d), modifying dispenser activation includes the step of increasing a dispense quantity of material within the replaceable cartridge, the step of decreasing a dispense quantity of material within the replaceable cartridge or the step of dispensing no material from within the replaceable cartridge.

In another embodiment, the dispenser includes a dispenser open detection system and the method further comprises the step of: h) monitoring if the dispenser has been opened and if the dispenser has been opened, i) monitoring if the replaceable cartridge has been removed and if the replaceable cartridge has been removed, repeating steps a) to h) and ii) monitoring if the replaceable cartridge has been removed and if the replaceable cartridge has been removed and an authorized code is present, modifying dispenser activation.

In another embodiment, if the dispenser has not been opened and an authorized code is present, dispenser activation is modified.

In yet another embodiment, the dispenser includes a dispense quantity counter system and the replaceable cartridge is intended for multiple activations while operatively connected to the dispenser, and the method further includes the steps of: I) monitoring each time a replaceable cartridge is activated while operatively connected to the dispenser and incrementing the counter system each time the replaceable cartridge is activated and wherein: i) If a pre-set threshold value is reached within the counter system, providing a signal to indicate that removal of the replaceable cartridge is required.

In another embodiment, the step of modifying dispenser activation is continued until the system verifies the replaceable cartridge has been removed.

In another aspect, the invention provides a dispenser for monitoring the status of a replaceable cartridge within a dispenser wherein the replaceable cartridge has an authorization code readable by the dispenser, the dispenser comprising: a controller for controlling activation of the dispenser; a verification system for reading the authorization code on the replaceable cartridge when the replaceable cartridge is operatively connected to the dispenser; a cartridge detection system for detecting if a cartridge is within the dispenser or not present within the dispenser; and wherein the controller i) modifies activation of the dispenser if the verification system determines an authorized code is present and the cartridge detection system determines a replaceable cartridge is not present and ii) modifies activation of the dispenser if the verification system determines an unauthorized code is present and the cartridge detection system determines a replaceable cartridge is present.

In another embodiment, when ii) occurs, the controller increases a dispense quantity of material from the replaceable cartridge, decreases a dispense quantity of material from the replaceable cartridge and/or prevents any material from the replaceable cartridge to be dispensed.

In another embodiment, the replaceable cartridge has an optical coating and the dispenser includes: a transmitter operatively located adjacent the optical coating for transmitting a first light signal against an optical coating when the replaceable cartridge is operatively connected to the dispenser; a receiver operatively located adjacent the optical coating on the replaceable cartridge for receiving reflected light off the optical coating; and, receiver electronics operatively connected to the receiver for interpreting reflected light at the receiver against an authorized signal and determining if the optical coating is an authorized or unauthorized optical coating.

In one embodiment, the dispenser is a coffee dispenser and the cartridge is a single use coffee cartridge.

BRIEF DESCRIPTION OF THE DRAWINGS

The invention is described with reference to the accompanying figures in which:

FIG. 1 is a sketch of a keying system in accordance with a first embodiment of the invention with an authorized optical coating;

FIG. 1A is a sketch of a keying system in accordance with a first embodiment of the invention with an un-authorized optical coating;

FIG. 2 is a sketch of a keying system in accordance with a second embodiment of the invention with an authorized optical coating;

FIG. 2A is a sketch of a keying system in accordance with a second embodiment of the invention with an un-authorized optical coating;

FIG. 3 is a sketch of a keying system in accordance with a third embodiment of the invention with an authorized optical coating;

FIG. 3B is a sketch of a keying system in accordance with one embodiment of the invention having a rotating substrate enabling a more complex code to be paired with a single transmitter/receiver;

DETAILED DESCRIPTION

Figure 3A:
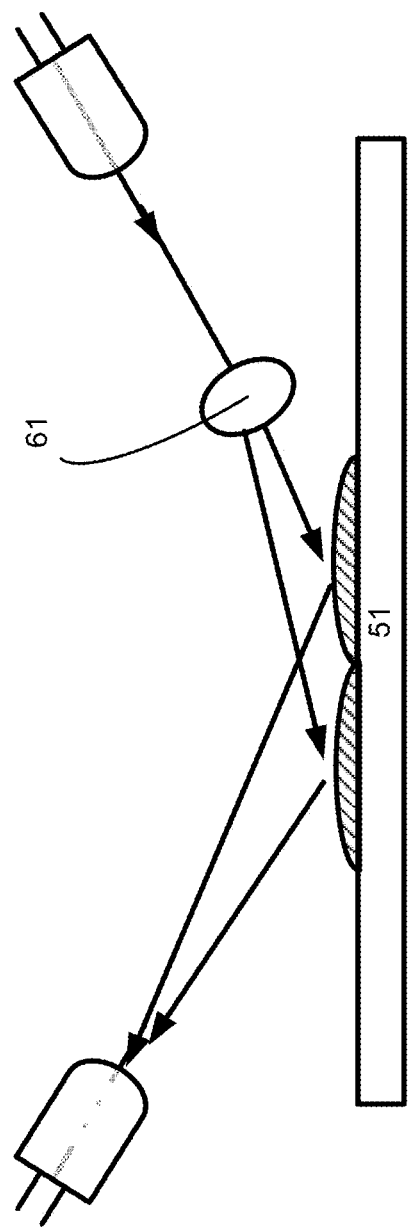
FIG. 3A is a sketch of a keying system in accordance with one embodiment of the invention having optics enabling a single transmitter/receiver pair to be used with two distinct optical coatings.

With reference to the figures, signal and detection systems for keying applications are described in which the reflectivity properties of various optical coatings including but not limited to inks, paints, pigments, and dyes are used to signal if an item on which the optical coating is placed is an authorized item or not. The system is described with reference to various examples in which underlying concepts of operation are described. As explained in greater detail, the concepts described herein may be used in different embodiments and applications in order to achieve the objectives of the invention. Generally, as is understood by those skilled in the art, a pigment or a dye is a component of a paint or ink that gives optical properties to the paint or ink. Pigments are generally suspended within a carrier liquid whereas dyes are generally soluble within a carrier liquid.

In more specific aspects, the invention describes the use of one or more LED transmitters, receivers and optical coatings including paints and inks (containing pigments or dyes) that can deployed in a number of configurations for keying applications. These embodiments utilize the absorption and reflection properties of the optical coatings allowing for the analysis of spectral responses. By combining one or multiple LED light sources with one or more optical coatings, a reflected signal pattern may be comprised of a variety of spectral features that can be used to define a specific authorized signal pattern.

In the context of this application, "keying" and "product pairing" mean the authorized matching of two products in order that the two products can work together to achieve a desired result, such as dispensing a product. In various embodiments, product pairing refers to the relationship between dispensing products that utilize a cartridge that contains a consumable product and the dispenser. Product pairing also includes the relationship between dispensing products wherein a consumable product has a life based on a number of dispense cycles.

Examples of products that may be paired include:
    a. Coffee brewing systems that utilize coffee cartridges.
    b. Printers and printer cartridges containing toner.
    c. Hand sanitizer dispensers utilizing replaceable cartridges of hand sanitizer.
    d. Soap dispensers utilizing replaceable cartridges of hand soap.
    e. Paper towel dispensers utilizing replaceable cartridges of paper towels.
    f. Air fresheners utilizing replaceable cartridges including aerosol cans, and liquid and solid air freshener cartridges.
    g. Water filter cartridge used within a water dispenser.

Importantly, the subject system can provide a number of advantages over other systems including lower power levels to achieve keying as well as lower material costs generally by using reflectance instead of fluorescence or phosphorescence for labelling or keying purposes.

In the context of this invention, any number of codes between two related products can potentially be established using the principles described herein that can be used by manufacturers/users to signal a wide number of meanings and initiate various actions. Similarly, the electronics used in signal generation and signal interpretation and any subsequent actions that associated electronics may initiate are highly variable but readily integrated to the technology described herein as understood by those skilled in the art.

In accordance with the invention and as shown in FIGS. 1A and 1B, in a first embodiment, a system 10 includes a transmitter 12 and a receiver 14. Generally, the transmitter emits light of a particular wavelength against an optical coating 16 whereupon the light is reflected towards a receiver 14. Based on the properties of the optical coating 16 (see FIG. 5), the signal received at the receiver will vary as a result of the degree of reflection and/or absorbance of light at the optical coating. By way of example, in FIG. 1, the transmitter emits a yellow beam of light 12a and the optical coating 16 has been engineered to reflect yellow light such that the transmitted signal 12a is substantially the same as received signal 14a at the receiver as shown by the solid line. A representative signal pattern for the transmitted and received signals are shown as signals 12b, 14b in which the both the wavelength and signal strength are shown to be substantially identical.

In contrast, as shown in FIG. 1A, if the optical coating 16a has properties that absorb yellow light, then the received signal 14c, 14d will be representative of the yellow light being absorbed by the optical coating. The partially absorbed signal is shown by the dotted line. Similarly, if transmitter 12 is changed to emit red light while the optical coating is designed to reflect yellow light a different received signal will be observed.

As a result, by altering the color of the transmitted light and/or the optical coating, and monitoring the reflection off the optical coating, the relative differences or similarities in spectral reflectivity, can be used to determine if the optical coating is authorized or not as may be interpreted by associated electronics. Thus, if the optical coatings are applied to products, the technology can be used to create coded information that can effectively allow or prevent the use of one product with another product (or other functions) when paired with the appropriate electronics.

In addition, the basic concepts described above can be expanded to create more complex signal responses and, hence, the relative degree of complexity in coding between two products as explained in greater detail below.

As shown in FIGS. 2, 2A, and 3, the system can be expanded to include illumination using more than one light sources and/or optical coating to allow for more complex system responses.

With reference to FIG. 2, a configuration 20 is described having two transmitters 22a, 22b in which transmitter 22a emits light of one color (eg. orange) and transmitter 22b emits infra-red. In this case, the optical coating 24 is reflective of orange light but not infra-red. As shown, the transmission signal 26 may comprise alternate pulses of orange 26a and infra-red 26b such that the received signal 28 is comprised of higher intensity 28a (corresponding to the orange light received) and lower 28b intensity (corresponding to the infra-red light) signals received at receiver 30. In this case, the alternating high and low intensity signals may be indicative of an authorized optical coating.

In comparison, as shown in FIG. 2A, a non-authorized optical coating 42 may absorb orange light and be partially reflective of infra-red resulting in a received signal 44 that does not match the authorized signal pattern. As such, the associated electronics would not recognize this signal as an authorized signal.

As shown in FIG. 3, a further combination 50 is described. In this case, distinct optical coatings on the same substrate 51 are provided with distinct transmitter and receiver pairs. A first optical coating 52 is paired with a first transmitter 54 and first receiver 56 and a second optical coating 58 is paired with a second transmitter 60 and second receiver 62. In this example, transmitters 54 and 60 emit the same light against different optical coatings 52 and 58 such that 64 and 66 transmit signals are identical but received signals 68 and 70 are different. As a result, the associated electronics would determine if the signals received for both transmitter/receiver pairs matched the authorized signal.

Importantly, the color and appearance of optical coatings can appear substantially identical to the naked eye such that in the absence of relatively sophisticated equipment, it becomes difficult for persons attempting to replicate the optical coating to do so. Moreover, as is understood by those skilled in the art, relatively minor differences in optical coating chemistry and the physical separation/positioning of the optical coatings can be sufficient to substantially alter the spectral response such that replication or duplication of the optical coating can be difficult.

In further examples, other combinations can be utilized. For example, systems can incorporate a greater number of transmitters against a single optical coating, different transmitters against spatially separated optical coatings and/or a different number of receivers. In other embodiments, duplicate transmitter and receiver systems could be employed in which both received signals would have to match within a threshold value to ensure authorization.

Figure 4:
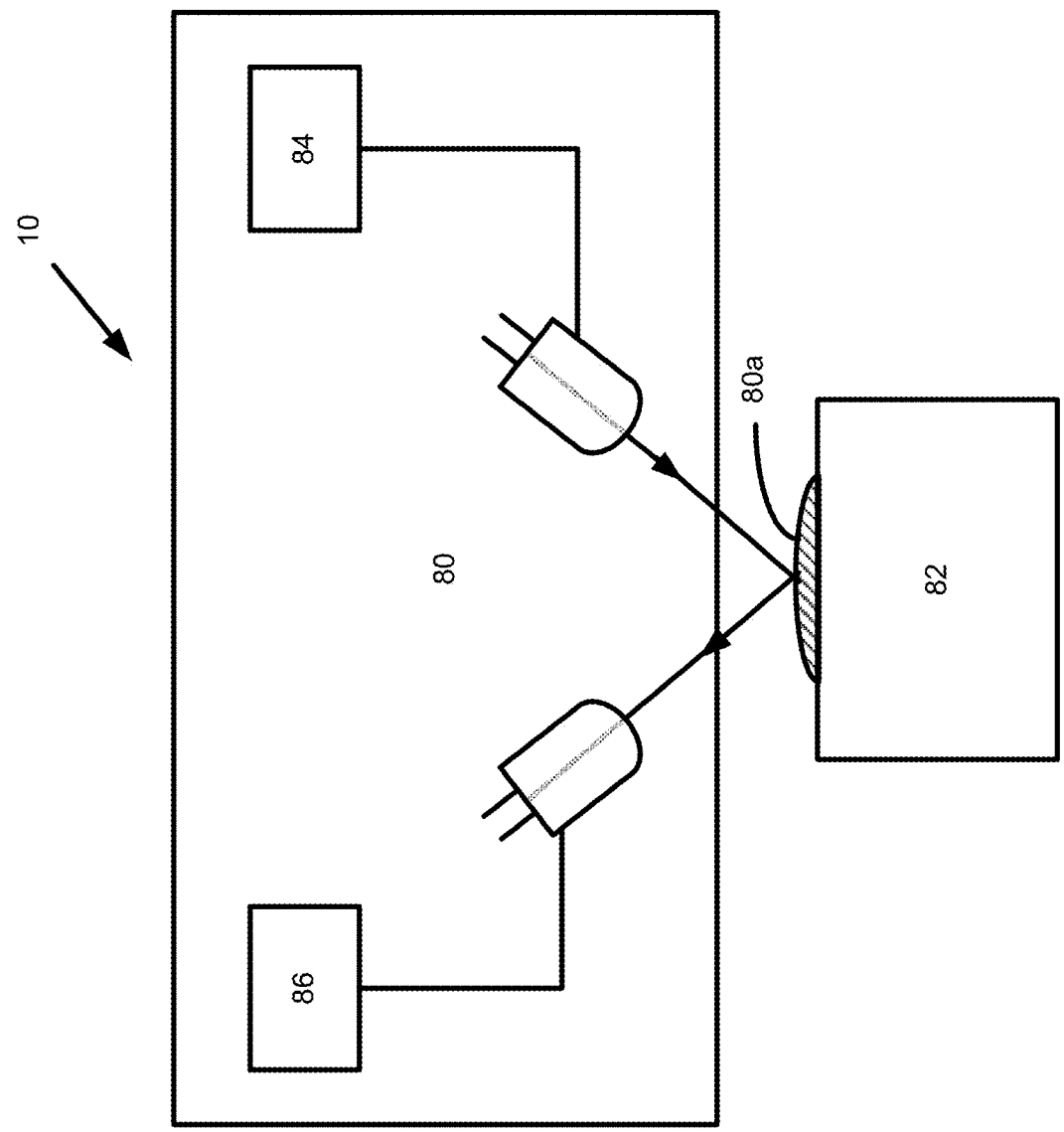
FIG. 4 is a sketch of a keying system in accordance with one embodiment of the invention as a product pair; and, FIG. 5 is a spectral reflection profile for a representative pigment showing three possible wavelengths that could be used in an embodiment of the invention.

FIG. 4 shows a representative deployment of the system in which a first product 80 is paired with a second product 82. As shown, the first product includes electronics 84 to provide a transmit signal and receiver electronics 86 to receive and interpret the receive signal in order to determine if the optical coating 80a on second product 82, and hence second product 82 is authorized for use with first product 80. As noted above, electronics 84 and receiver electronics 86 can be designed to provide a wide variety of functions as understood by those skilled in the art and as described in greater detail below.

In particular, in the case of specific dispensers, the method of pairing products further includes additional features that enhance the operability of the pairing process with the objective of minimizing the ability of competitors to defeat the pairing process.

Figure 6:
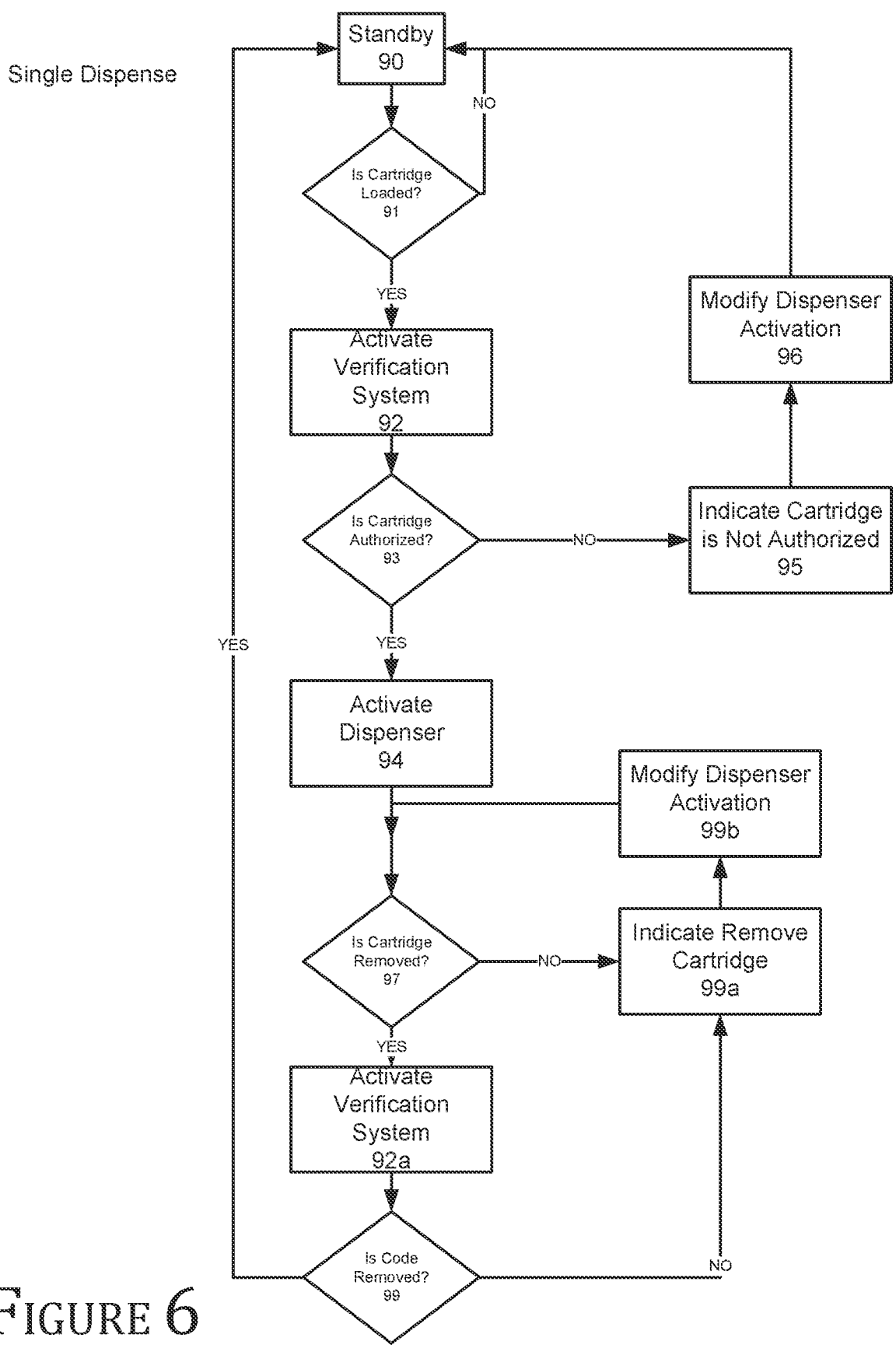
FIG. 6 is a flowchart showing a method of validating a single cartridge within a dispenser in accordance with one embodiment of the invention.

FIG. 6 is a flowchart illustrating a method of validating an optical code. In particular, in some product pair systems, particularly those where a consumable product is replaced frequently, the motivation for competitors to try to defeat the code may be higher in which case, additional steps may be required to counteract attempts to overcome a code or trick the dispenser into thinking it is reading a valid code. For example, in the case of coffee cartridges (or other drink cartridges), where a user uses a separate coffee cartridge for each cup of coffee, verification of a code occurs with every use. As such, competitors may attempt to trick the coffee brewing machine into thinking that a valid cartridge has been inserted. Such techniques may include removing a valid code from an authorized cartridge and affixing that valid code adjacent the reader such that the valid code remains in an operatively connected position while unauthorized cartridges are placed into and removed from the coffee brewing machine. Thus, each time the coffee brewing machine is opened, an unauthorized cartridge is placed within the machine but the machine is reading a valid code that has been placed adjacent the reader and so the brewing/dispensing operation is allowed.

Figure 7:
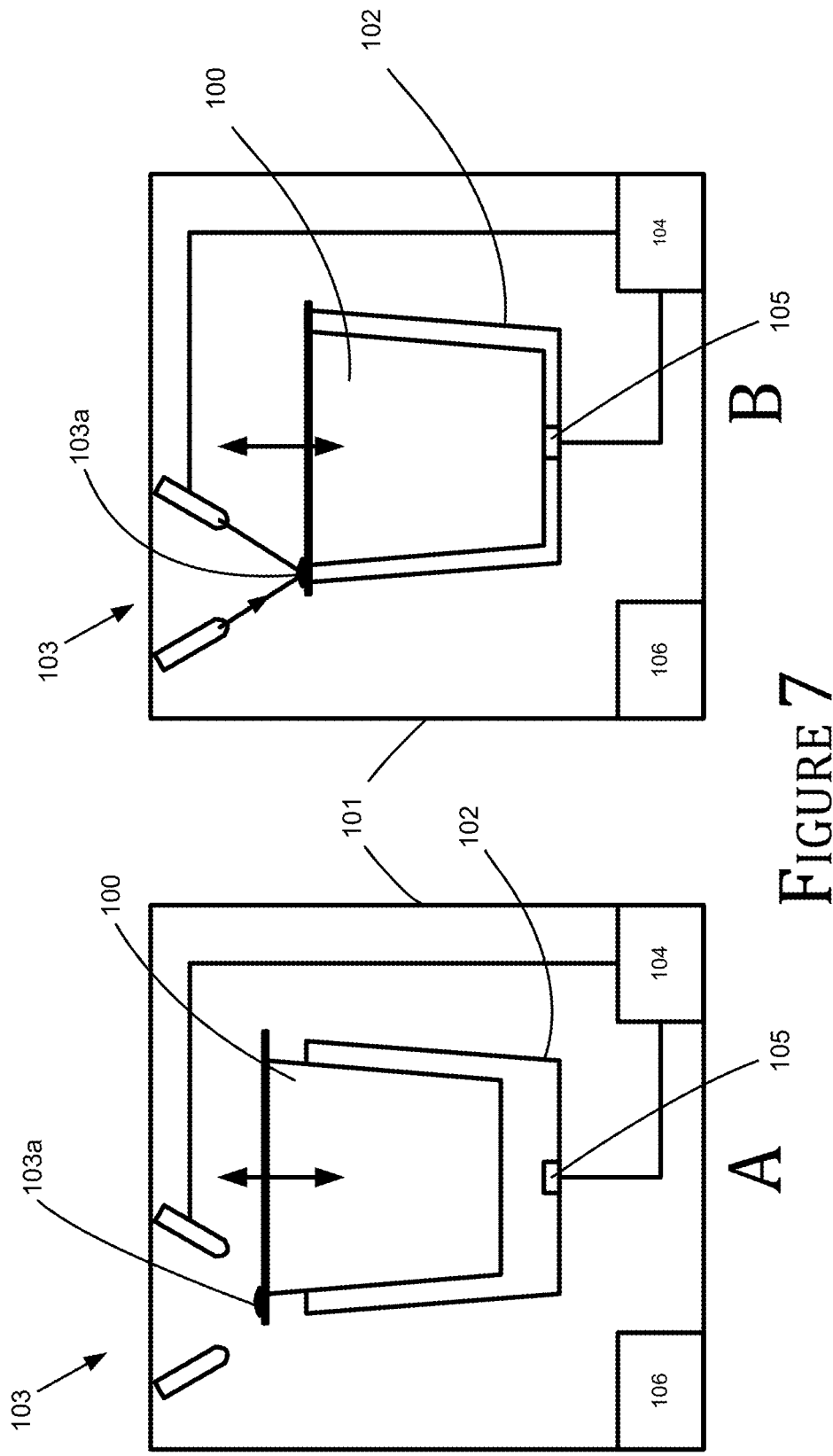
FIG. 7 is a schematic diagram showing the interaction of a single use replaceable cartridge with a dispenser in accordance with one embodiment of the invention in a partially engaged (A) and engaged (B) position.

In accordance with one embodiment of the invention and with reference to FIG. 6, a method of verifying an activation code within a dispensing system is described and in particular for a single dispense cartridge. FIG. 7 is a schematic diagram showing how a cartridge 100 (such as a single use coffee cartridge) may be placed within a coffee brewing machine 101. As is known, a cartridge may be placed in a basket 102 (A) whereupon closing a lid or the like the cartridge is in an operative position to enable a dispense cycle (eg. a brew cycle) to be completed (B). When in the operative position, a verification system 103 may be initiated where optically readable codes 103a on the coffee cartridge 100 may be read and interpreted by a controller 104 to enable or deny the dispense cycle. An alert system 106 is utilized to effect visual and/or audio communication to a user. After use, the cartridge 100 is removed for completion of the cycle.

In accordance with past single-use cartridge verification systems, a dispenser will typically initially be in a standby mode 90 awaiting a user to take an action. Periodically, the dispenser will check to see if a cartridge is loaded 91. If the dispenser determines that a cartridge is loaded, the dispenser will activate the verification system 92. If no cartridge is detected, the dispenser will continue to wait 90, 91 for a cartridge to be loaded. The dispenser will then check if the cartridge is an authorized cartridge 93 by pre-determined protocols that read and verify the code on the cartridge. If the code is verified as authorized, the dispenser will be activated 94. If the code is not authorized, the dispenser will typically indicate that the cartridge is not authorized 95 and may also modify dispenser activation 96 before returning to standby 90, 91. In the context of this description, modify dispenser activation can include various actions such as dispensing more material, dispensing less material and/or dispensing no material. Other activities could also include more dispenser specific activities such as dispensing unheated water in the case of a hot beverage dispenser.

For example, the dispenser may cause extra material to be dispensed from an unauthorized cartridge such that the unauthorized consumable material is used up more quickly which may then cause the operator who is attempting to use an unauthorized cartridge to realize that there are no cost savings as the unauthorized material is used at a higher rate. A dispenser where this may be programmed could be a soap dispenser that is programmed to dispense 1 ml of soap with each activation with an authorized soap cartridge but will dispense 2 ml of soap with an unauthorized cartridge which will result in the operator utilizing soap at roughly double the rate.

Alternatively, the dispenser may cause less material to be dispensed. In this case, an insufficient amount of material may be dispensed for the user to use requiring repeated actions to dispense a required quantity or produces an unsatisfactory result. In this case, this may lead to a user being frustrated with the dispenser and cause the user to avoid the dispenser. The combination of users/operators being frustrated and, potentially, less material being dispensed may cause an operator to seek the authorized cartridge solution. An example of this type of dispenser may be an air freshener in a washroom where the dispenser typically dispenses 1 ml of an authorized product but only 0.1 ml of an unauthorized product. In this case, the user/operator may become frustrated as an insufficient amount of air freshener is dispensed which results in a washroom with un-freshened air. Another example may be a printer toner cartridge that results in faded pages to be printed.

Still further, the dispenser may cease operation of the dispenser with an authorized cartridge, in which case, the user will be unable to use the product. In this case, the user will be frustrated by the dispenser. Moreover, the operator will have purchased product that does not work in the dispenser which will provide motivation to purchase the authorized product. Random combinations of increased, decreased, or no dispensing could also be utilized.

Returning to FIGS. 6 and 7, if the dispenser has been activated 94, in order to overcome attempts to trick the dispenser, the dispenser will seek to verify that the cartridge has been removed 97. The dispenser may check to see that a cartridge has been removed by various systems 105 including optical, mechanical or electrical systems or a combination thereof and report that status to the controller. If the system determines that the cartridge has been removed, the dispenser will activate the verification system 92a to again check if there is an authorized code present. If the verification system 92a determines that there is no authorized code 99 (i.e there is no code present and no cartridge), the system will return to the standby mode 90 awaiting a new cartridge with an authorized code. That is, in this situation, the system will assume that any authorized code has been fully cleared or removed from the dispenser in which case the cycle begins anew.

In the alternate, if when a cartridge has been removed, the verification system determines that a cartridge is still present (for example, an authorized code is being read) 99, the system will assume that a user/operator is trying to trick the system in which case, a message 99a inviting the user to remove the cartridge is displayed and dispenser activation may be modified 99b as described above. The system will then check to see if the cartridge has been removed 97 and the process will repeat.

Under these scenarios, the dispenser will have a system 105 to determine whether a cartridge is present or not as shown in FIG. 7. Such systems may include various sensing systems including but not limited to optical, mechanical and electrical systems and various combinations thereof.

Additional steps may also be taken in order to address the possibility of a user trying to trick the dispenser with an unauthorized cartridge. That is, in some cases of single or multiple use cartridges, the dispenser may include a system that determines if the dispenser has been opened before checking for an authorized cartridge. That is, the dispenser may assume that when the dispenser is being opened that the cartridge is being replaced. For example, the dispenser may only check for an authorized cartridge when the dispenser has been opened and then closed again. In this type of dispenser system, some users may attempt to trick the dispenser to think that the dispenser is never opened and thus, be able to replace cartridges while the dispenser thinks that it has not been opened. Various means for doing this may be to permanently close a cover switch such that even when opened the dispenser electronics believes the cover is closed. In the case of an optical system that is looking for a change in ambient light levels, a user may cover an optical sensor such that the dispenser electronics believes the cover is closed.

Figure 6A:
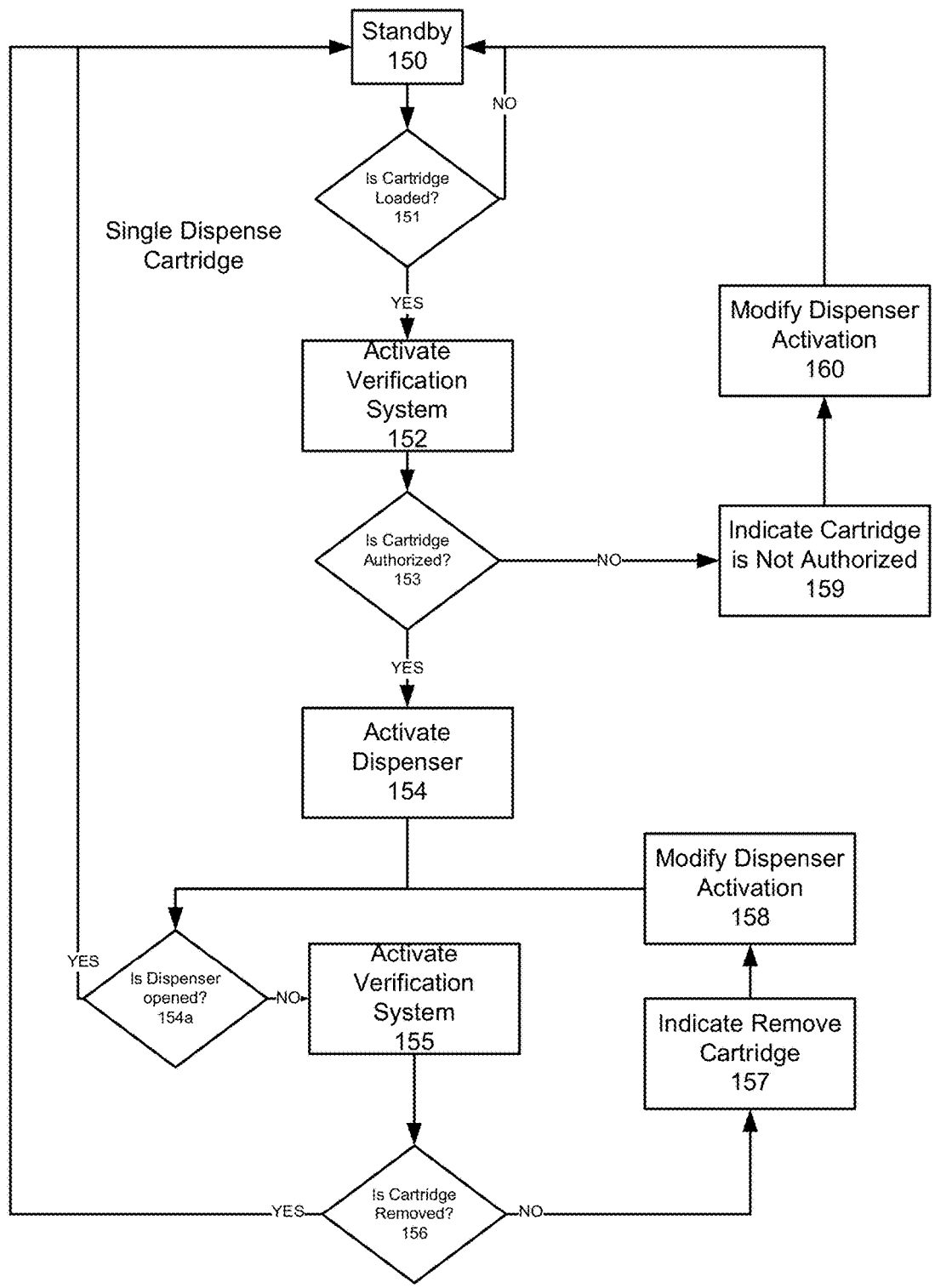
FIG. 6A is a flowchart showing a method of validating a single-dispense cartridge within a dispenser in accordance with one embodiment of the invention.

As shown in FIG. 6A, a process of checking to ensure that a user is not attempting to overcome the authentication process is described for a single use cartridge. In this case, after a dispenser has been activated 154 (after verifying an authorized cartridge from steps 150-153), the system checks to determine if the dispenser is open 154a. If the dispenser is detected as being open, the system assumes that a cartridge is being replaced and the system returns to the stand-by mode 150. If the system detects that the dispenser has not been opened, that is a switch (or the like) has not been opened, the system will activate the verification system 155. If the system determines that the cartridge has been removed (156) because it does not detect a code, the system will assume the cartridge has been removed and the system will return to the standby mode 150. Alternatively, if the system detects a code, the system will assume that an attempt is being made to trick the system (i.e because the dispenser has not been opened), and will ask for cartridge removal 157 and may modify dispenser activation 158. The system will then continue to check whether the dispenser has been opened or not 154*a* as described above.

Figure 6B:
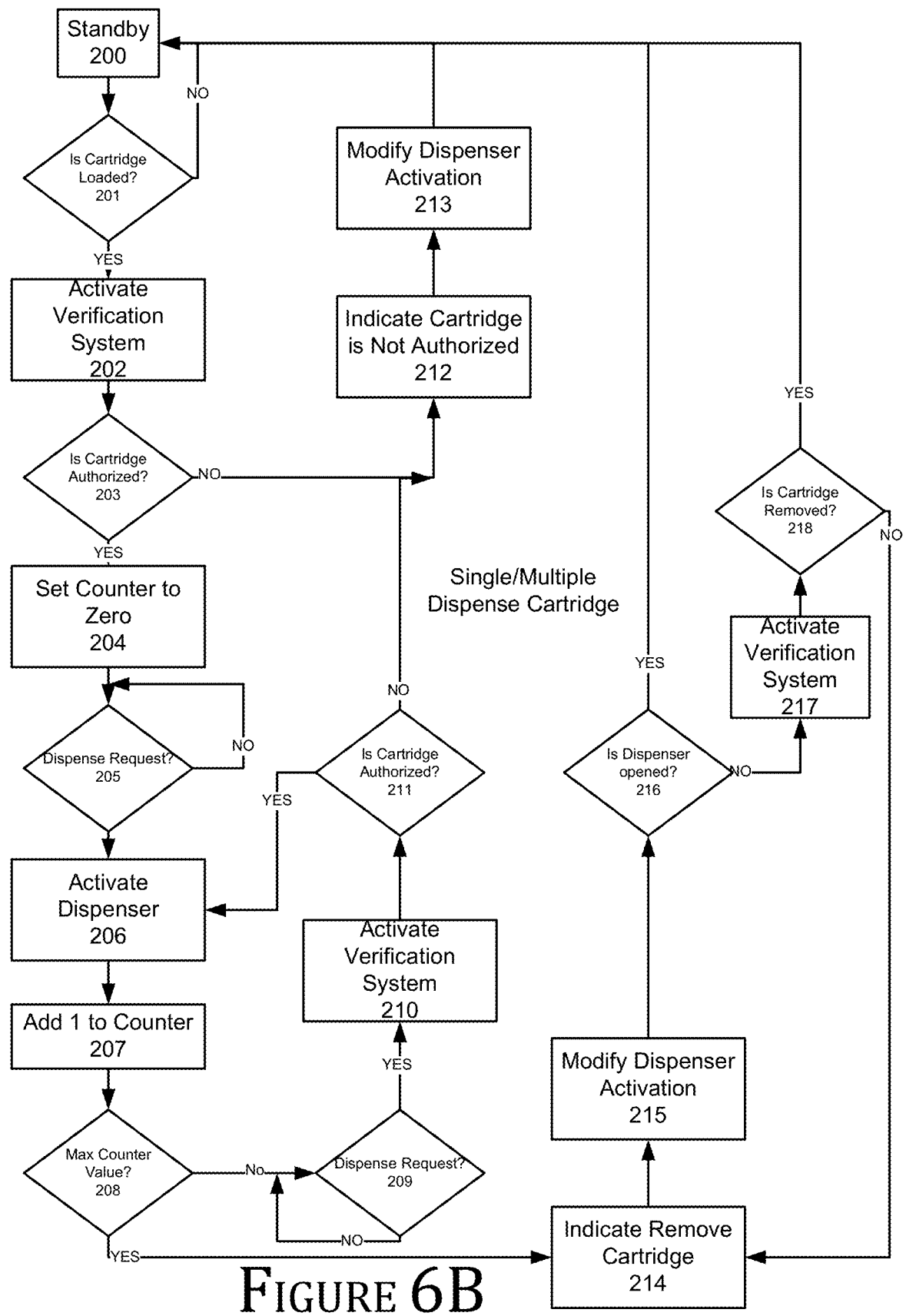
FIG. 6B is a flowchart showing a method of validating a single or multiple cartridge within a dispenser in accordance with one embodiment of the invention.

As shown in FIG. 6B, in the case of a single or multiple dispense cartridge, the dispenser may also wish to monitor the amount of product being dispensed as a means of determining whether or not a user is trying to trick the system.

In this case, after initially determining that a cartridge is loaded and authorized (steps 200, 201, 202 and 203), the system sets a counter to a value 204, which in this example is zero. The system then waits for a dispense request to be received 205. If a request is received, the dispenser is activated 206, otherwise the system continues to wait for a dispense request 205. If the dispenser is activated, the initial value set within the counter is adjusted. In this example, the value one is added to the counter although it is understood that the underlying logic may utilize a variety of algorithms to determine an expiry threshold for the cartridge. The system then checks 208 to determine if a maximum or threshold counter value has been reached. If no, the system waits for a dispense request 209. If a dispense request is received, the verification system is again activated to determine if the cartridge is authorized 211. If the cartridge is authorized, the dispenser is activated 206 and another value is added to the counter 207. If at 208, the maximum or threshold counter value has been reached, the system will indicate for the user to remove the cartridge 214 and modify dispenser activation 215 until the cartridge is removed. The system will then check 216 to determine if the dispenser has been opened. If yes, the system will assume that the dispenser is being operated correctly and return to standby mode 200. If the system determines that the dispenser has not been opened 216, the system will activate the authentication system 217 to determine if the cartridge has been removed 218, for example by the presence or absence of a code as described above. If the cartridge has been removed (eg. no code detected), the system will return to the standby mode 200. If the cartridge is detected as being present, the system will return to box 214 and indicate that the cartridge must be removed.

Accordingly, under this scenario, once a cartridge is within a machine, the system will a) check to ensure that authorized cartridges are being used b) monitor the rate of consumption or use of the cartridge to ensure that it is being used only to a pre-determined threshold (typically time, number of dispenses or quantity of material) and c) monitors i) if the dispenser is opened to replace a cartridge and ii) that the cartridge is removed.

As such, the number of steps that the system undertakes makes it increasingly difficult for a user to try to trick the system. It should be noted that monitoring the rate of consumption or use of the cartridge together with a step of ensuring that after a threshold value has been reached that a code is not seen, provides an effective way of ensuring that an attempt has not been made to affix an authorized code to a reader in such a way that cartridges can be replaced with the dispenser thinking that it is reading an authorized code while unauthorized cartridges are being replaced.

EXAMPLES

Example 1—Signal Strength

Signal strength experiments were conducted to determine the voltage response of reflected LED light against a reflective paint substrate. An LED (3.5V; 5 mA) was positioned adjacent a reflective paint containing 10C873 pigment (Shepard Color Company). Reflected light was received by a light-to-voltage (LTV) converter (TS252 with a 10 k$\Omega$ load) having an integrated lens and optimized for a visible light and near IR response. A 3.5 V signal was received by the LTV convertor thereby demonstrating that a significant signal can be received at the LTV.

Example 2—LED Sensor Module

A photodiode (Hamamatsu S2386-18L) having a similar spectral sensitivity to the photodiode of example 1 was tested with 410 and 680 nm and 430 and 650 nm LEDs respectively. The photodiode showed significant signal can be received at the photodiode.

Example 3—Use of Two Paints Having Similar Appearance But Different Reflecting Characteristics Two black paints, black 30C591 and black 20F944 (Shepard Color Company) were deposited on a substrate in a side-by-side alignment and illuminated using a 950 nm LED. The received signal at the LTV was measured at 3.25 V with Black 30C591 and 1.25V with Black 20F944 thus indicating that substrates having substantially similar colors can provide a distinct reflectivity pattern from different regions of a coated substrate with a fixed input wavelength of light.

Example 4—Two Color Illumination

Paints having an uneven spectral curve of reflectivity were illuminated with two distinct wavelengths and the reflected signals were compared. Brown 10C873 (Shepard Color Company) was illuminated with orange LED light (595 nm) and IR LED light (950 nm). A TSL 252 photosensor was used to detect reflected light. The results showed that 595 nm light produced almost no reflected signal whereas the 950 nm light produced a significant reflected signal. These results showed that a single paint can provide a distinct reflectivity pattern from different LED light sources.

In a second experiment, Yellow 10P270 pigment (Shepard Color Company) was illuminated with a blue LED (470 nm) and red LED (650 nm). The results indicated that reflection at 640 nm was approximately 6 fold higher than reflection at 470 nm.

In this experiment, a control substrate (paper surface having no paint) was compared to the painted test substrates and revealed that the reflectivity of the unpainted substrate at both 470 nm and 650 nm was substantially similar (±5%).

Example 5—Rotating Substrate

With reference to FIG. 3B, one embodiment 70 of the keying system is described in which the substrate is incorporated onto a rotating surface 73 with a transmitter 71 and receiver 72 positioned to transmit 71a and receive 72a light to and from the rotating surface. Importantly, this embodiment allows significantly more complex codes to be incorporated with the substrate without the need or complexity of additional transmitter/receiver pairs. For example, the substrate may include a plurality of stripes 74 on the outer or inner surface of the rotating substrate such that each stripe will pass the reflection point of the transmitter/receiver pair as the substrate rotates. Thus, as can be understood, the relative complexity of codes that can be incorporated onto a rotating substrate can be substantially increased by varying such parameters as the paint (i.e. type) of the stripes, the width of stripes and/or the shape of the substrate. As a representative example, FIG. 3B shows an input signal 71b that based on the properties of the stripes may produce a received signal 72b having the profile characteristics as shown. In this example, both the width of the stripes and the paint types has been varied to produce the authorized signal that is recognized and interpreted by the associated electronics. As above, each of the stripes may be substantially identical in color to any underlying substrate and to each other and thus can be effectively indistinguishable to the naked eye as representing a code.

Example 6—Three Color Illumination

Figure 5:
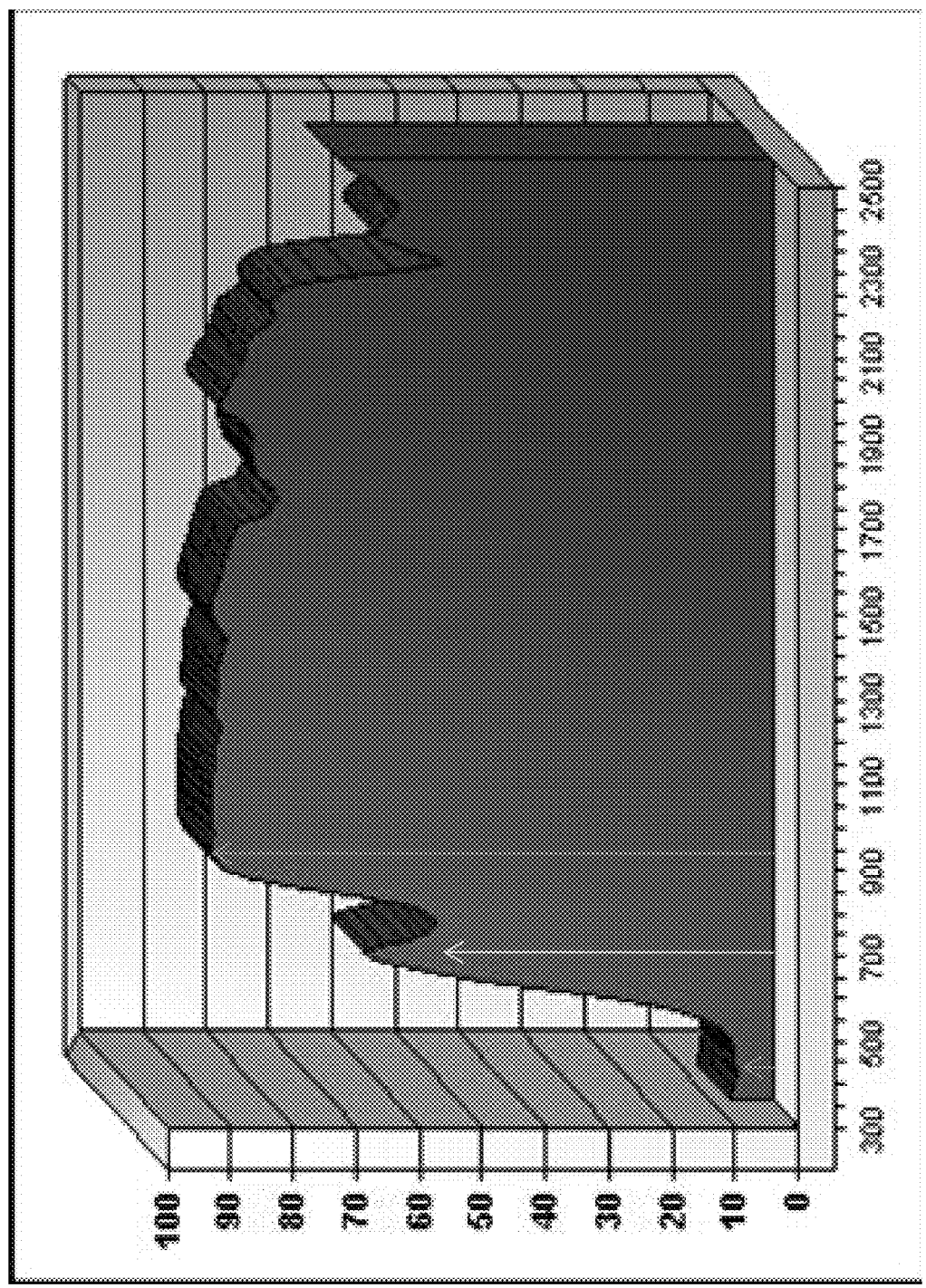

The potential for using a single paint (eg. Yellow 10P270) was examined for use with three different colored LEDs. In this case, the spectral profile of reflectivity of the paint could be used to monitor differential signal patterns from the various input wavelengths. As shown in FIG. 5, the reflective profile of the paint has a various peaks and valleys that can be "matched" to the input LED wavelengths such that ranges of input wavelengths can be utilized to establish reflectivity responses that provide expected absolute or differential signals. For example, for the reflective profile, input wavelengths of 400-470 nm will provide an expected 10% reflection response whereas a 690-700 nm and 940-950 nm input will provide an expected 60% and 90% reflection response respectively. As such, the absolute values and/or ratios of the responses can be compared to establish an authorized code signal.

Implementation Examples

Three-Color LED

A single three color LED may be utilized to effect a more complex code signal as described in relation to FIG. 5 in a more compact package. For example, three color (red, green, blue) LEDs can be configured to provide a sequenced and patterned output of different colored light along a common beam path. As such, the light can be readily directed against a common substrate requiring only a single receiver to receive the signal from each color. Moreover, more than one three-color LEDs may be paired with corresponding receivers and paints to generate additional reflectance codes that may be combined together to represent an authorized signal.

"Invisible" Bar Code

A bar code type system can be designed using a combination of paints having a substantially identical appearance to the naked eye but that provide a specific reflection response under specific illumination. In this case, as noted above, paints can be selected to substantially match the color of the underlying substrate/product such that the "code" is effectively not visible to the casual observer.

This implementation was tested in which a bar code was designed using two black paints (Black 30C591 (termed 0) and Black 20F944 (termed 1)) in which three alternating bands of each paint were painted on a substrate and illuminated with a 950 nm LED. That is, the bar code had the pattern 010101. The code was read by consecutive displacement of the bar code relative to the LED/sensor pair. The results showed a reflection pattern discernable as a corresponding "high" voltage signal x and "low" voltage signal y, ie. xyxyxy.

In various embodiments of the bar code, the associate electronics can be designed in accordance with the physical characteristics of a product pair and/or the relative complexity of the code. That is, a bar code can be implemented utilizing a single LED/sensor pair in which the code is read by movement of LED/sensor pair relative to the code or where multiple LED/sensor pairs are oriented above each bar code element (i.e. color or stripe).

Importantly, it is understood that based on these principles, a wide range of signal patterns can be created that utilize various combinations of parameters of the LEDs, sensors, paints, physical orientation and movement of the elements, and size and shape of the substrate paints.

It is also understood that the associated electronics can be designed to provide various functions to a specific embodiments such as including power saving strategies that minimize or reduce power consumption through proximity switches and/or pulsed signals. In various embodiments, the system may also include one or more optical elements 61 that allow a single light source to be directed against different optical coatings as shown in FIG. 3A. In this case, the optical elements may be used to split the transmitter light to separate optical paths that are directed to the different optical coatings. Depending on the geometry and reception characteristics of the receiver, a single receiver may utilized to receive reflected light from both optical coatings.

Product Pair Relationship

The physical relationship between a product pair will contribute to the type of code that may be implemented. Generally, the physical space that is available, the separation and/or the movement of one component relative to another may determine the specific design of keying system. Features such as proximity switches and pulsed powered may be utilized to minimize power consumption as understood by those skilled in the art.

Paints

In accordance with the invention, as described above, a number of different paints/inks having dyes/pigments can be utilized to exploit the reflective properties of the paints/inks. The ultimate selection of paints/inks, as understood by those skilled in the art, will be based on the desired keying application and consider a number of factors relevant to that application including but not limited to factors such as the level of desired security, the form and size of the substrate and the color of the substrate.

Paints/inks can be applied to substrates using a variety of known production techniques.

LEDs

Factors used in selecting suitable LEDs include but are not limited to the spectral emission profile, the spatial dimensions (eg. Angular dimensions) of the emission profile, and the emission colors.

Photo Sensors

Photo sensors may be selected based on factors including but not limited to spectral sensitivity (eg. Visible, IR and near IR), the spatial dimensions of response, size (eg. Profile size and dimensions) and speed. Photo sensors can include photodiodes, phototransistors and light-to-voltage converters.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A method of monitoring the status of a replaceable cartridge within a dispenser, the method comprising the steps of:
   a) from a standby mode, monitoring if the replaceable cartridge is operatively connected to the dispenser;
   b) if the replaceable cartridge is detected as operatively connected to the dispenser, determining if the replaceable cartridge has at least one authorized code;
   c) if the replaceable cartridge has at least one authorized code, enabling activation of the dispenser;
   d) if the replaceable cartridge does not have the at least one authorized code, modifying dispenser activation;
   e) monitoring if the replaceable cartridge has been removed from the dispenser;
   f) detecting if the replaceable cartridge has been removed from the dispenser, and if the replaceable cartridge has been removed from the dispenser, determining if the at least one authorized code is present within the dispenser; and
   g) if the at least one authorized code is determined to be present in step f), modifying dispenser activation.

2. The method as in claim 1 wherein if in step f) no at least one authorized code is present, return to the standby mode.

3. The method as in claim 1 wherein if in step f) the at least one authorized code is present, displaying on a display a signal instructing removal of the replaceable cartridge.

4. The method as in claim 3 wherein if in step d) an unauthorized code is present, displaying on the display a signal instructing removal of the replaceable cartridge.

5. The method as in claim 1 wherein in steps g) and d), modifying dispenser activation includes the step of increasing a dispense quantity of material within the replaceable cartridge.

6. The method as in claim 1 wherein in steps g) and d), modifying dispenser activation includes the step of decreasing a dispense quantity of material within the replaceable cartridge.

7. The method as in claim 1 wherein in steps g) and d), modifying dispenser activation includes the step of dispensing no material from within the replaceable cartridge.

8. The method as in claim 2, wherein the dispenser has a display and if in step f) at least one authorized code is present, displaying on the display a signal instructing removal of the replaceable cartridge.

* * * * *